July 21, 1953 D. S. DURSTON 2,646,145
ELECTROMAGNETIC CLUTCH AND BRAKE DEVICE
Filed Sept. 1, 1949 2 Sheets-Sheet 2
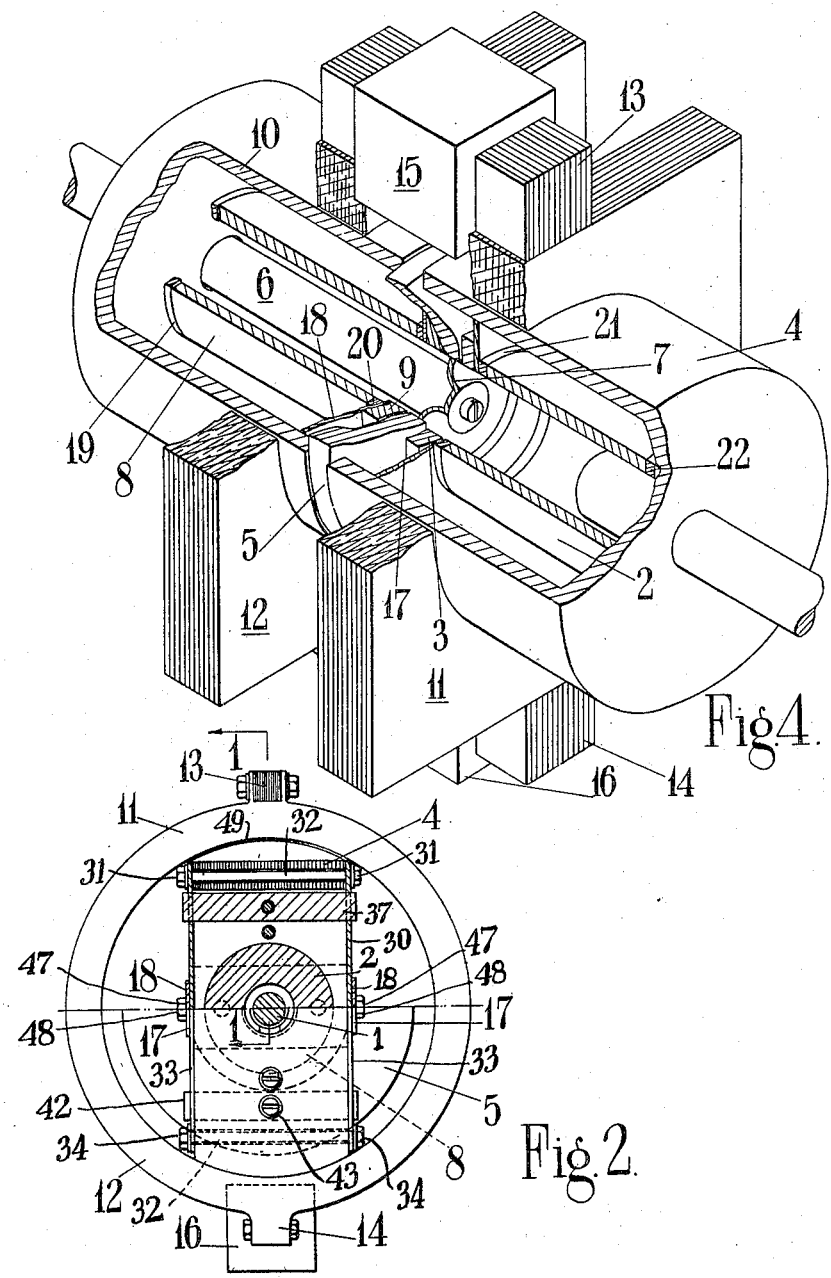
Inventor,
David Stanley Durston,
by Hall & Houghton,
Attorneys.

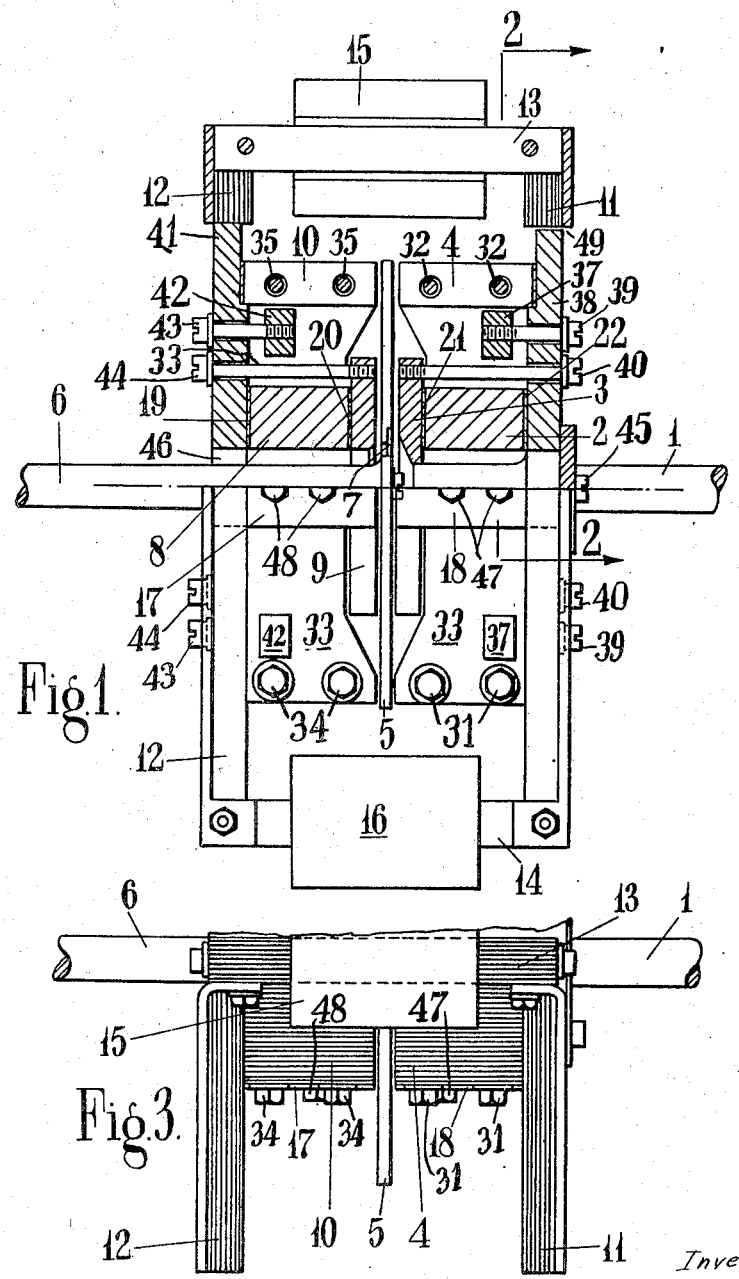

Patented July 21, 1953

2,646,145

UNITED STATES PATENT OFFICE 2,646,145

ELECTROMAGNETIC CLUTCH AND BRAKE DEVICE

David Stanley Durston, London, England, assignor of one-half to Samuel Williams & Sons Limited, London, England Application September 1, 1949, Serial No. 113,549
In Great Britain September 6, 1948

7 Claims. (Cl. 192—18)

This invention relates to high-speed friction clutches and/or brakes and more particularly, though not exclusively, to integrator and recording mechanism for weighing gear associated with cranes.

In friction clutch and braking mechanism for integrators and recording mechanism for the weighing gear of cranes, the following desiderata come into question:

(1) The clutch must operate extremely rapidly.

(2) The inertia of the outgoing shaft which works the recorder, etc. must be kept low.

(3) The outgoing shaft must be brought to a standstill rapidly after being de-clutched from the incoming shaft.

(4) A very small amount of power should be adequate to operate the apparatus, the operations being initiated by a direct current micro-switch.

The main object of the present invention is to provide apparatus wherein the actuation of a high speed friction clutch and brake may be performed with a high degree of precision and with achievement of the above desiderata.

A further object is to provide improved constructions of friction clutches and friction brakes.

The invention consists in high-speed friction clutch and brake, friction clutch or friction brake mechanism incorporating features as set out in the claims appended hereto.

Referring to the accompanying diagrammatic drawings:

Figure 1 is a side elevation partly in section, the section being taken on the line 1—1 of Figure 2 of one convenient arrangement of mechanism embodying the present invention.

Figure 2 is a front elevation partly taken in section, the section being taken on the line 2—2 of Figure 1, and Figure 3 is a partial plan view thereof.

Figure 4 is a partially cut away isometric view of a further embodiment of the invention.

In carrying the invention into effect according to one form illustrated by way of example in the accompanying drawings as applied to a high-speed friction clutch and brake for use with integrator and recording mechanism for weighing gear associated with a crane, on an input shaft 1 a permanent magnet 2 of cylindrical form with poles at opposite ends is provided, these being associated with a soft iron magnetic circuit comprising a central pole shoe 3 and a paramagnetic outer return path 4. The exposed end of the outer return path 4 and the exposed face of the central pole shoe 3 are separated by a small gap from a disc armature 5 mounted on an output shaft 6 coaxial with the input shaft, the mounting 7 (a flexible ring) being such as to permit the armature 5 to move axially in relation to the output shaft 6 while remaining in driving connection therewith, the two magnetic circuits together constituting a polarizing magnet means.

On the other side of the armature 5 and separated therefrom by a small air gap, is a further permanent magnet 8 and a magnetic circuit 9, 10 similar to that associated with the input shaft 1.

The outer return path members 4 and 10 are associated with a further magnetic circuit comprising two laminated annuli 11 and 12 surrounding the return path members 4 and 10 and joined by one or more coil cores 13 and 14 together with their respective coils 15 and 16. The annulus 12 is in magnetic contact with the outer return path 10 and annulus 11 is spaced from the outer return path 4 by a small air gap. The annuli 11 and 12 and coil cores 13 and 14 may be composed of laminations and those portions of the return paths 4 and 10 associated with the coil magnetic circuits may be laminated or composed of an alloy iron having a low eddy loss.

In the form of Figs. 1, 2 and 3 the return paths 4 and 10 are formed of longitudinally directed laminations, the stacks of laminations of the paths 4, as best shown in Fig. 2 being secured between parallel side plates 30 by hex-headed screws 31 threaded into the transverse bars 32 and the stacks of laminations 10 being secured between like parallel side plates 33 by hex-headed screws 34 threaded into rods 35 in like manner. The side plates 30 have apertures therethrough in the form shown, in which cross pieces 37 are engaged, and these cross pieces are secured to end plates 38 as by draw-bolts 39, like draw-bolts 40 being used to secure the pole piece 3 and magnet 2 to the end plate 38 in this embodiment. In like manner, in the form shown, the side plates 33 of return paths 10 are secured to an end plate 41 by cross pieces 42 and draw bolts 43, with pole piece 9 and magnet 8 also secured to said end plate 41 by draw bolts 44. The first end plate 38, in this embodiment, as best shown in Fig. 1, is mounted on the input shaft 1, being secured thereon by bolts 45, thus mounting the magnet 2, pole piece 3 and return paths 4 to rotate with shaft 1 as above described. The second end plate 41, in this embodiment, surrounds the output shaft 6, but is spaced therefrom as shown at 46, Fig. 1, and is supported by the annular ring 12. Thus the end plate 41 and the parts of magnetic circuit 8, 9, 10 carried by it remain stationary with the annular and longitudinal electromagnetic cores 11, 12, 13, 14 and the coils carried by the latter. The small air gap 49 between the annulus 11 and the end plate 38 allows the shaft 1 and the magnetic assembly carried by it to rotate within the assembly 11—16.

The fluxes of the two permanent magnets 2 and 8 are brought into balance by extending sufficient iron strips or shims 17 and 18 from the pole shoes 3 and 9 to the return paths 38 and 41 of the rotating and fixed magnetic assemblies, respectively, these strips being secured in place, in the form shown, by bolts 47 and 48 engaging the side plates 30 and 33, respectively.

The air gaps between the armature and the return paths are adjustable by means of shims 19, 22 and those between the armature and pole shoes by means of shims 20, 21. In order to reduce the coil flux necessary to operate the clutch and brake, the faces associated with air gaps between the armature 5 and the return path members 4 and 10 are plated with a non-magnetic material or alternative means are adopted to ensure that small non-magnetic gaps remain between these members.

The biasing magnet means, operating coils 15 and 16 in the form shown, may consist either of coils having a continuous winding in which case the polarity of the coils must be reversed to effect clutching or braking, or alternatively, the coils may each have a centre tap in which case either half is energised according to whether clutching or braking is desired.

In operation, the fluxes from the polarizing magnets 2 and 8 converge and pass through armature 5 radially outwards where they split again after passing through the small air gaps to return to their respective magnets via the outer return paths 4 and 10.

The operating coils 15 and 16 serve to send a secondary or biasing flux through their cores 13 and 14 and annulus 11, hence radially and axially through the outer return path 4, axially through the armature 5, and axially and radially through the outer return path 10, and hence back to the coil cores via annulus 12. This secondary flux increases the flux on one side of the armature and decreases it on the other, this attracting the armature to the side having the increased flux, thus either clutching the armature frictionally to the input shaft via the outer return path 4 or braking it frictionally against the fixed return path 10.

In practice, after braking or clutching the armature 5 does not return to the central position. If the polarising current is removed the armature will remain attracted to the member it rests upon, but with a greatly decreased force, the amount of which varies with the air gap and the thickness of the non-magnetic plating on the return paths and armature.

The above description applies equally to the embodiment shown in Figure 4 where instead of having the outer return path structures of rectangular form they are shown in circular.

In view of the differential nature of the magnetic circuit the ampere turns are very much smaller than would be necessary with an orthodox type of electromagnet and the inductance of the coils is kept low and the time constant short. Laminating those portions of the circuit subject to large flux changes also assists to this end.

A high-speed braking clutch produced as above was found to transmit a torque of 8 lb. inches with an applied polarizing force of 150 ampere turns and disengage the output from the input shaft and bring the former from a speed of 15 R. P. M. to a standstill in approximately 5 milliseconds.

From the foregoing description it will be apparent that for the purpose of a clutch the present construction provides for drawing the armature 5 of the shaft 6 against the rotating unit 2, 3, 4 for frictionally engaging the same. It will also be apparent that for the purpose of a brake, the invention draws the armature 5 of the rotating shaft 6 against the stationary magnet unit 8, 9, 10 for frictionally engaging the latter. In addition it will be appreciated that in both instances the flux from the permanent magnet passes radially outwardly through the armature 5, and that the subsidiary flux from the control coil 15 only passes through a small proportion of the main magnetic circuit, which can therefore run at a high flux density. In other words, in the present invention, each of the permanent magnets 2, 8 has its own substantially closed flux circuit with only the armature portion 5 in common, and the control coil 15 also has its own flux circuit, with only the elements 10, 5 and 4 as the principal elements in common with the flux circuits of magnets 2 and 8.

It will be appreciated that the paramagnetic return paths via elements 4 and 10, from the energising portions of the magnet circuits shown as permanent magnets 2 and 8 and electromagnets 15 and 16, provide paths for the flux from the polarizing magnet means 2 and 8 to the armature, and from the biasing magnet means 15 and 16 to the armature, respectively, that for each magnet means avoids passing through the energizing portion of the other.

I claim:

1. A high speed friction clutch and brake mechanism comprising driving and driven shafts, armature means secured to said driven shaft for rotation therewith and in part movable at right angles to the direction of rotation thereof, a first polarizing permanent magnet circuit mounted on said driving shaft for rotation therewith and comprising an energizing portion and a paramagnetic return flux path terminating in juxtaposition to said armature in spaced relation to each other, a fixed support, a second polarizing permanent magnet circuit mounted on said support and comprising an energizing portion and a paramagnetic return flux path terminating in juxtaposition to said armature in spaced relation to each other and in position to attract the movable part of the armature away from said first magnetic circuit, and a fixedly positioned electromagnet having a core the ends of which are disposed on opposite sides of said armature and juxtaposed respectively to said paramagnetic return paths, whereby the energizing of said coil to produce flux in said core augments the effective flux of one of said return paths and reduces that of the other to effect movement of the movable parts of said armature in clutching and braking directions depending on the polarity of the flux produced in said core.

2. A mechanism according to claim 1, in which the armature extends radially and in which the portions of each of said polarizing magnetic circuits juxtaposed thereto are disposed at different radial distances from its axis.

3. A high speed friction clutch and brake mechanism comprising colinear driving and driven shafts, a longitudinally movable armature secured to said driven shaft for rotation therewith, a first polarizing permanent magnet circuit mounted on the driving shaft for rotation therewith and comprising an energizing portion and a paramagnetic return flux path with the ends of said circuit proximate to said armature at different radial distances from its axis, a fixed support, a second polarizing permanent magnet circuit mounted on said support on the opposite side of said armature from said first polarizing circuit and comprising an energizing portion and a paramagnetic return flux path with the ends of said second circuit proximate to said armature at different radial distances from its axis, whereby said armature affords a radially extending flux path associated with the gaps between the ends of each of said polarizing magnet circuits that are radially proximate to and radially remote from the axis of said shafts, and a fixedly positioned electromagnet having a core the ends of which are disposed on opposite sides of said armature and juxtaposed respectively to said paramagnetic return flux paths so that its flux path includes the gap between said return paths in which the armature is located, whereby the energizing of said coil to produce flux in its core augments the effective flux of one of said return paths and reduces that of the other, to effect movement of said armature in clutching and braking directions depending on the direction of the flux produced in said core.

4. A device of the class described comprising a rotatable shaft, armature means secured thereto for rotation therewith and in part movable at right angles to the direction of rotation thereof, parts comprising two polarizing permanent magnet circuits mounted in opposing relation on opposite sides of the movable part of said armature means and spaced therefrom and each comprising an energizing portion and a paramagnetic return flux path portion terminating in juxtaposition to said armature in spaced relation to each other, at least one of said polarizing magnet circuits being fixed against rotation, and a fixedly positioned electromagnet having a core one end of which is juxtaposed to said paramagnetic return path of one of said polarizing magnet circuits and the other end of which is juxtaposed to said paramagnetic return path of the other polarizing magnet circuit lying in opposition thereto, whereby the energizing of said coil to produce flux in said core augments the effective flux of one of said polarizing magnet circuits and reduces that of the other to effect movement of said armature to engage with and disengage from the parts comprising said fixedly mounted magnetic circuit.

5. A device of the class described comprising a rotatable shaft, armature means secured thereto for rotation therewith and in part movable at right angles to the direction of rotation thereof, parts comprising two polarizing permanent magnet circuits mounted in opposing relation on opposite sides of the movable part of said armature means and spaced therefrom and each comprising an energizing portion and a paramagnetic return flux path portion terminating in juxtaposition to said armature in spaced relation to each other, at least one of said polarizing magnet circuits being rotatably mounted, and a fixedly positoined electromagnet having a core one end of which is juxtaposed to said paramagnetic return path of one of said polarizing magnet circuits and the other end of which is juxtaposed to said paramagnetic return path of the other polarizing magnet circuit lying in opposition thereto, whereby the energizing of said coil to produce flux in said core augments the effective flux of one of said polarizing magnet circuits and reduces that of the other to effect movement of said armature to engage with and disengage from the parts comprising said rotatably mounted magnetic circuit.

6. A high speed friction clutch and brake mechanism comprising driving and driven shafts; armature means secured to said driven shaft for rotation therewith and at least in part movable at right angles to the direction of rotation thereof; polarizing magnet means comprising first and second polarizing magnet circuits; said first polarizing magnet circuit being mounted on said driving shaft for rotation therewith and comprising an energizing portion and a paramagnetic return flux path portion each juxtaposed to said armature in spaced relation to each other to form a first substantially closed polarizing magnetic circuit with said armature; a fixed support; said second polarizing magnet circuit being mounted on said fixed support and comprising an energizing portion and a paramagnetic return flux portion each juxtaposed to said armature in spaced relation to each other to form a second substantially closed polarizing magnetic circuit with said armature; a fixedly positioned biasing magnet means having a core the ends of which are juxtaposed to said paramagnetic return flux portions; said paramagnetic return flux portions affording a path through said armature of low reluctance, thereby avoiding passage of any substantial part of the biasing flux through the energizing portions of said first and second magnetic circuits, and the polarities of said biasing and polarizing magnet means being relatively reversible, for moving said armature means to and fro between said polarizing magnet circuits.

7. A device of the class described comprising a rotatable shaft; armature means secured thereto for rotation therewith and at least in part movable at right angles to the direction of rotation thereof; polarizing magnet means comprising first and second polarizing magnet circuits; said first circuit being mounted at one side of said movable part of said armature means and spaced therefrom, and comprising an energizing portion and a paramagnetic return flux path portion each juxtaposed to said armature in spaced relation to each other to form a first substantially closed polarizing magnetic circuit with said armature; said second polarizing magnet circuit being mounted at the other side of said movable part of said armature means and spaced therefrom and comprising an energizing portion and a paramagnetic return flux portion each juxtaposed to said armature in spaced relation to each other to form a second substantially closed polarizing magnetic circuit with said armature; and biasing magnet means having an energizing portion and paramagnetic core means the ends of which are disposed on opposite sides of said armature means in juxtaposition to said paramagnetic return flux portions, the polarities of said biasing and polarizing magnet means being relatively controllable for moving said armature means to and fro between said polarizing magnet circuits.

DAVID STANLEY DURSTON.

References Cited in the file of this patent

UNITED STATES PATENTS

| Number | Name | Date |
| --- | --- | --- |
| 1,155,124 | Berger | Sept. 28, 1915 |
| 2,453,957 | Allen | Nov. 16, 1948 |